United States Patent
Assaf et al.

(10) Patent No.: US 9,494,090 B2
(45) Date of Patent: Nov. 15, 2016

(54) SYSTEM AND METHOD FOR CONTROLLING AN ENGINE IN A BI-FUEL VEHICLE TO PREVENT DAMAGE TO A CATALYST DUE TO ENGINE MISFIRE

(71) Applicant: GM Global Technology Operations LLC, Detroit, MI (US)

(72) Inventors: Tameem K. Assaf, Milford, MI (US); Louis A. Avallone, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 717 days.

(21) Appl. No.: 13/788,564

(22) Filed: Mar. 7, 2013

(65) Prior Publication Data
US 2014/0257674 A1    Sep. 11, 2014

(51) Int. Cl.
| | |
|---|---|
| F02D 19/06 | (2006.01) |
| F02D 41/00 | (2006.01) |
| F02D 41/22 | (2006.01) |
| F02D 41/30 | (2006.01) |
| F02D 13/02 | (2006.01) |

(52) U.S. Cl.
CPC ....... *F02D 19/0615* (2013.01); *F02D 19/0613* (2013.01); *F02D 19/0623* (2013.01); *F02D 19/0647* (2013.01); *F02D 41/0025* (2013.01); *F02D 41/0027* (2013.01); *F02D 41/22* (2013.01); *F02D 41/3094* (2013.01); *F02D 13/0238* (2013.01); *F02D 2200/1015* (2013.01); *Y02T 10/18* (2013.01); *Y02T 10/36* (2013.01)

(58) Field of Classification Search
CPC .............. F02D 19/06; F02D 19/0613; F02D 19/0615; F02D 19/12; F02D 19/0642; F02D 2200/1015; F02D 41/0027; F02D 41/1497; F02D 41/402; F02D 19/081; F02D 35/02

USPC .............. 123/525, 435, 436, 431, 299, 300; 73/114.02
See application file for complete search history.

(56) References Cited

U.S. PATENT DOCUMENTS

| | | | |
|---|---|---|---|
| 3,972,230 A * | 8/1976 | Hanson | G01M 15/11 701/99 |
| 4,445,326 A | 5/1984 | Lyon | |
| 5,044,195 A * | 9/1991 | James | G01M 15/11 73/114.05 |
| 5,268,086 A | 12/1993 | Hamburg et al. | |
| 5,361,629 A * | 11/1994 | McCombie | G01M 15/11 701/110 |

(Continued)

FOREIGN PATENT DOCUMENTS

| | | |
|---|---|---|
| GB | 2277594 A | 11/1994 |
| JP | 2011-064075 | 3/2011 |

OTHER PUBLICATIONS

U.S. Appl. No. 14/276,031, filed May 13, 2014, Assaf et al.

(Continued)

*Primary Examiner* — Lindsay Low
*Assistant Examiner* — Robert Werner

(57) ABSTRACT

A system according to the principles of the present disclosure includes a misfire detection module and a fuel control module. The misfire detection module detects misfire in a cylinder of an engine. The fuel control module controls a first fuel system to deliver a first fuel to the cylinder and controls a second fuel system to deliver a second fuel to the cylinder. The first fuel and the second fuel are different types of fuel. The fuel control module selectively switches from delivering the first fuel to the cylinder to delivering the second fuel to the cylinder when misfire is detected in the cylinder.

25 Claims, 3 Drawing Sheets

(56) References Cited

U.S. PATENT DOCUMENTS

| | | |
|---|---|---|
| 5,431,044 A | 7/1995 | Kiess et al. |
| 5,437,154 A | 8/1995 | Sato et al. |
| 5,506,778 A | 4/1996 | Matsumoto et al. |
| 5,661,974 A | 9/1997 | Kitamura et al. |
| 5,700,954 A | 12/1997 | Sinha et al. |
| 5,735,246 A | 4/1998 | Vincent et al. |
| 5,755,211 A | 5/1998 | Koch |
| 5,822,710 A | 10/1998 | Mezger et al. |
| 5,826,563 A | 10/1998 | Patel et al. |
| 5,832,721 A | 11/1998 | Cullen |
| 5,841,025 A | 11/1998 | Remboski et al. |
| 5,956,941 A | 9/1999 | Cullen et al. |
| 6,092,015 A | 7/2000 | Takahashi et al. |
| 6,244,042 B1 | 6/2001 | Dickers et al. |
| 6,269,632 B1 | 8/2001 | Schmitz |
| 6,314,802 B1 | 11/2001 | Wu et al. |
| 6,360,724 B1 | 3/2002 | Suhre et al. |
| 6,371,092 B1 * | 4/2002 | Guglielmo .......... F02D 35/0092 123/435 |
| 6,388,444 B1 | 5/2002 | Hahn et al. |
| 6,405,705 B1 | 6/2002 | Dunsworth et al. |
| 6,520,159 B2 | 2/2003 | White et al. |
| 6,691,507 B1 | 2/2004 | Meyer et al. |
| 6,847,882 B2 * | 1/2005 | Miller ................ H03H 17/0263 123/406.24 |
| 6,885,932 B2 * | 4/2005 | Liu ........................ G01M 15/11 123/357 |
| 7,007,460 B2 | 3/2006 | Frieden et al. |
| 7,069,718 B2 | 7/2006 | Surnilla et al. |
| 7,158,875 B2 * | 1/2007 | Yasui .................. F02D 41/1497 701/111 |
| 7,325,446 B1 | 2/2008 | Assaf et al. |
| 7,359,793 B2 | 4/2008 | Galtier et al. |
| 7,500,470 B2 | 3/2009 | Buslepp et al. |
| 7,591,172 B2 | 9/2009 | Lynch et al. |
| 7,627,416 B2 | 12/2009 | Batenburg et al. |
| 7,654,248 B2 | 2/2010 | Buslepp et al. |
| 7,680,583 B2 | 3/2010 | McKay et al. |
| 7,752,900 B2 | 7/2010 | Galtier et al. |
| 7,765,857 B2 | 8/2010 | Suzuki |
| 7,913,673 B2 | 3/2011 | Vanderslice et al. |
| 7,941,265 B2 | 5/2011 | Miller et al. |
| 8,027,782 B2 * | 9/2011 | Assaf .................. F02D 41/1498 123/406.5 |
| 8,091,538 B2 * | 1/2012 | Hartmann .......... F02D 19/0615 123/406.27 |
| 8,166,956 B2 | 5/2012 | Ulrey et al. |
| 8,275,538 B2 | 9/2012 | Surnilla et al. |
| 8,307,808 B2 | 11/2012 | Kaiser et al. |
| 8,342,158 B2 | 1/2013 | Ulrey et al. |
| 8,392,096 B2 | 3/2013 | Mathews et al. |
| 8,555,863 B2 * | 10/2013 | Nakayama .......... F02D 19/0615 123/525 |
| 8,601,862 B1 * | 12/2013 | Bowman ............. F02D 41/0097 73/114.04 |
| 8,646,252 B2 | 2/2014 | Gibson et al. |
| 8,812,219 B2 * | 8/2014 | Shinoda ............. F02D 19/0615 123/575 |
| 9,046,049 B2 | 6/2015 | Jeon et al. |
| 9,233,679 B2 | 1/2016 | Leone |
| 2004/0206071 A1 | 10/2004 | Glugla et al. |
| 2006/0101823 A1 | 5/2006 | Takemoto et al. |
| 2009/0133464 A1 | 5/2009 | Sell et al. |
| 2009/0184105 A1 | 7/2009 | Hasegawa |
| 2010/0162803 A1 | 7/2010 | Scafati et al. |
| 2011/0017174 A1 | 1/2011 | Ulrey et al. |
| 2011/0023590 A1 | 2/2011 | Van Nieuwstadt et al. |
| 2011/0066358 A1 | 3/2011 | Assaf et al. |
| 2011/0167797 A1 | 7/2011 | Gibson et al. |
| 2011/0253100 A1 | 10/2011 | Kaiser et al. |
| 2011/0253101 A1 | 10/2011 | Mathews et al. |
| 2012/0143480 A1 | 6/2012 | Pursifull |
| 2012/0210981 A1 | 8/2012 | Ulrey et al. |
| 2014/0020655 A1 * | 1/2014 | Ito ..................... F02D 41/22 123/339.1 |
| 2015/0307075 A1 | 10/2015 | Leone |

OTHER PUBLICATIONS

Mizushima, Norifumi; Ito, Shingo; Kusaka, Jin; and Daisho, Yasuhiro; "Improvement of Combustion in a Dual Fuel Natural Gas Engine with Half the Number of Cyclinder," JSAE 20030146; SAE 2003-01-1938; Waseda University; International Springs Fuels & Lubricants Meeting, Yokohama, Japan; May 19-22, 2003; 10 Pages.

U.S. Appl. No. 13/477,627, filed May 22, 2012, Bowman et al.

* cited by examiner

SYSTEM AND METHOD FOR CONTROLLING AN ENGINE IN A BI-FUEL VEHICLE TO PREVENT DAMAGE TO A CATALYST DUE TO ENGINE MISFIRE

FIELD

The present disclosure relates to systems and methods for controlling an engine to prevent damage to a catalyst due to engine misfire in a bi-fuel vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines. When an engine misfires, an air/fuel mixture provided to a cylinder may not combust at all or may combust only partially.

SUMMARY

A system according to the principles of the present disclosure includes a misfire detection module and a fuel control module. The misfire detection module detects misfire in a cylinder of an engine. The fuel control module controls a first fuel system to deliver a first fuel to the cylinder and controls a second fuel system to deliver a second fuel to the cylinder. The first fuel and the second fuel are different types of fuel. The fuel control module selectively switches from delivering the first fuel to the cylinder to delivering the second fuel to the cylinder when misfire is detected in the cylinder.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
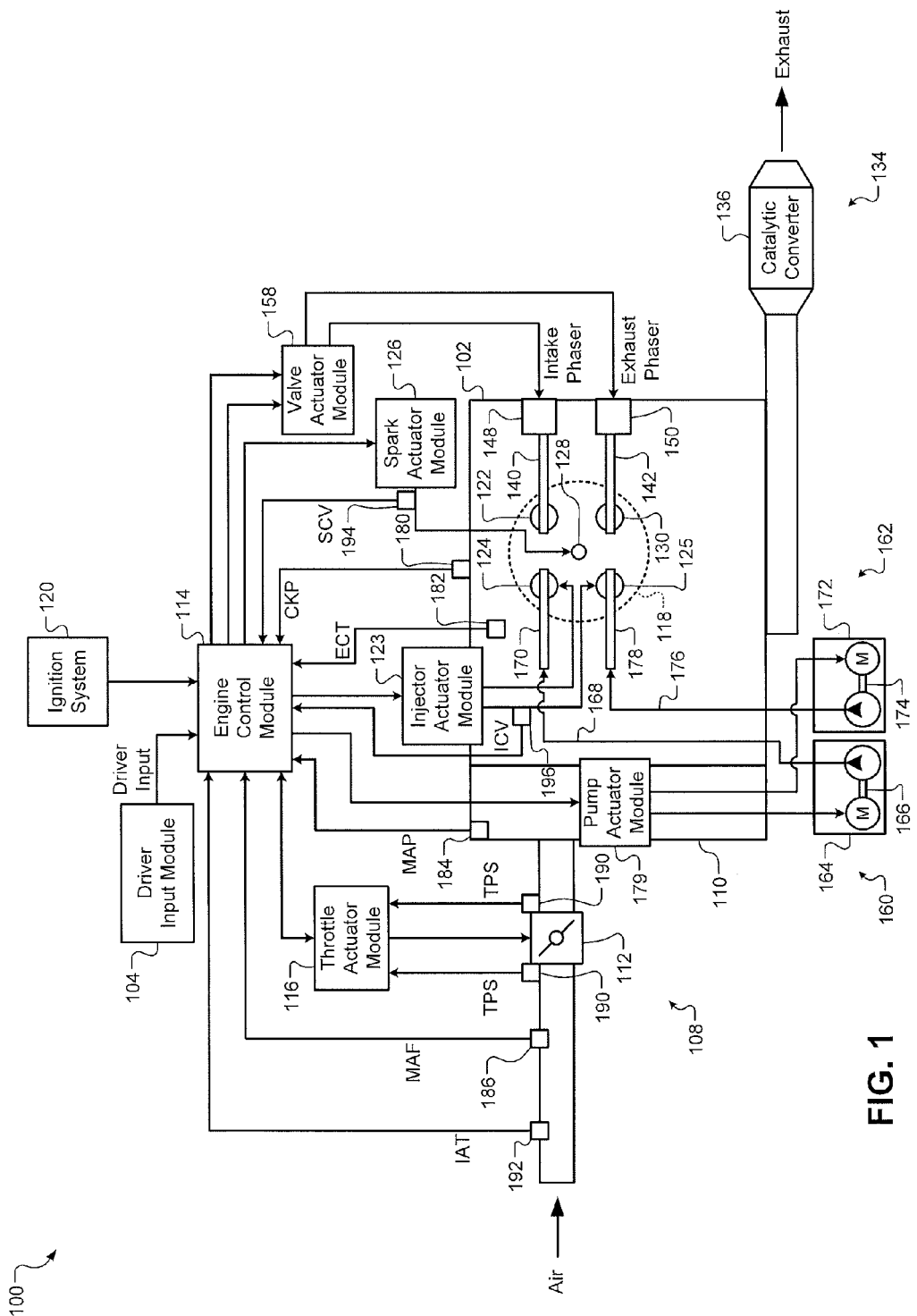
FIG. 1 is a functional block diagram of an example engine system according to the principles of the present disclosure.

When an engine misfires, unburned fuel may be exhausted from a cylinder of the engine. The unburned fuel may then combust within a catalytic converter in an exhaust system of the engine, which may increase the temperature of a catalyst in the catalytic converter. As a result, the catalyst may be damaged, and the ability of the catalyst to reduce emissions may be diminished. In addition, the level of emissions produced by the engine may increase due to misfire.

A misfire detection system may detect misfire based on changes in engine speed and deactivate the misfiring cylinder(s). Deactivating a misfiring cylinder may prevent damage to the catalyst. However, deactivating a misfiring cylinder may also decrease the torque output of an engine by, for example, 25 percent to 33 percent, which may negatively impact drivability.

Misfire may occur in an engine of a bi-fuel vehicle. A bi-fuel vehicle may include two separate fuel systems that deliver fuel to cylinders of an engine from two separate fuel sources. In addition, the two fuel systems may deliver two different types of fuel such as a liquid fuel (e.g., gasoline, diesel, liquefied petroleum gas (LPG)) and a gaseous fuel (e.g., compressed natural gas, vaporized LPG, hydrogen).

A system and method according to the present disclosure switches the type of fuel delivered to cylinders of an engine in a bi-fuel vehicle when misfire is detected. For example, the system and method may switch from delivering gaseous fuel to delivering liquid fuel. Switching the type of fuel delivered to the cylinders when misfire is detected may eliminate misfire and thereby prevent catalyst damage and reduce emissions without negatively impacting drivability.

Misfire may be due to insufficient delivery of spark or fuel, or insufficient mixing of air and fuel. Thus, a fault in a spark plug circuit may cause misfire when liquid fuel or gaseous fuel is delivered to the cylinders. Therefore, the system and method may not switch the type of fuel delivered to the cylinders when misfire is detected if a fault is detected in the spark plug circuit. If a fault is detected in the spark plug circuit and misfire may damage a catalyst, the system and method may deliver liquid fuel to the cylinders. Liquid fuel may decrease the temperature of the catalyst through evaporative cooling and may not combust, react, or be oxidized at or near the catalyst if the average air/fuel ratio of the cylinders is a rich air/fuel ratio. In addition, using liquid fuel may allow the air/fuel ratio to be enriched by a greater amount without causing misfire relative to a gaseous fuel such as compressed natural gas. In other words, the amount by which an air/fuel ratio may be enriched may be limited when using a gaseous fuel relative to a liquid fuel. In addition, using a liquid fuel such as LPG may allow the air/fuel ratio to be enriched by a greater amount without causing misfire relative to a liquid fuel such as gasoline. Further, in addition to cooling the catalyst, enriching the air/fuel ratio may increase the torque output of the engine, which may compensate for a decrease in torque output due to misfiring cylinders.

Referring to FIG. 1, an engine system 100 includes an engine 102 that combusts an air/fuel mixture to produce drive torque for a vehicle. The engine 102 produces drive torque based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders.

The ECM 114 may start and stop the engine 102 based on an input received from an ignition system 120. The ignition system 120 may include a key or a button. The ECM 114 may start the engine 102 when a driver turns the key from an off position to an on (or run) position or when the driver presses the button. The ECM 114 may stop the engine 102 when a driver turns the key from the on position to the off position or when the driver presses the button while the engine 102 is running. The ECM 114 may deactivate one or more cylinders while the engine 102 is running, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls an injector actuator module 123, which regulates an opening duration of a fuel injector 124 and a fuel injector 125 to achieve a desired air/fuel ratio. Fuel may be injected into the intake manifold 110 at a central location or at multiple locations, such as near the intake valve 122 of each of the cylinders. The fuel injectors 124, 125 may inject fuel directly into the cylinders and/or into mixing chambers associated with the cylinders. The injector actuator module 123 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134. The exhaust system 134 includes a catalytic converter 136 that reduces emissions.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake cam phaser 148 and the exhaust cam phaser 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 and the exhaust valve 130 by decoupling the intake valve 122 and the exhaust valve 130 from the intake camshaft 140 and the exhaust camshaft 142, respectively. In various implementations, the intake valve 122 and/or the exhaust valve 130 may be controlled by devices other than camshafts, such as electrohydraulic and/or electromagnetic actuators.

The engine system 100 may include a fuel system 160 and a fuel system 162. The fuel system 160 includes a fuel tank 164, a fuel pump 166, a fuel line 168, a fuel rail 170, and the fuel injector 124. The fuel tank 164 may store a liquid fuel such as gasoline, diesel, or liquefied petroleum gas (LPG).

The fuel pump 166 delivers fuel from the fuel tank 164 to the fuel rail 170 through the fuel line 168. The fuel rail 170 distributes fuel to the fuel injector 124.

The fuel system 162 includes a fuel tank 172, a fuel pump 174, a fuel line 176, a fuel rail 178, and the fuel injector 125. The fuel tank 172 may store a gaseous fuel such as vaporized LPG, compressed natural gas, or hydrogen. The fuel pump 174 delivers fuel from the fuel tank 172 to the fuel rail 178 through the fuel line 176. The fuel rail 178 distributes fuel to the fuel injector 125. The ECM 114 controls a pump actuator module 179, which regulates the output of the fuel pump 166 and the fuel pump 174 to achieve a desired pressure in the fuel line 168 and the fuel line 176, respectively.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The voltage within a spark plug circuit may be measured using a spark circuit voltage (SCV) sensor 194. The spark plug circuit may include the spark plug 128, the spark actuator module 126, and/or other electrical components used to supply power to the spark plug 128 (e.g., relays, wires, connectors).

The voltage within a fuel injector circuit may be measured using an injector circuit voltage (ICV) sensor 196. The fuel injector circuit may include the fuel injectors 124, 125, the injector actuator module 123, and/or other electrical components used to supply power to the fuel injectors 124, 125 (e.g., relays, wires, connectors). The fuel injector 124 may be included in a first injector circuit and the fuel injector 125 may be included in a second injector circuit that is separate from the first injector circuit. In addition, the ICV sensor 196 may include multiple sensors, which may measure voltage at one or more locations in each of the injector circuits. The ECM 114 may use signals from the sensors to make control decisions for the engine system 100.

Figure 2:
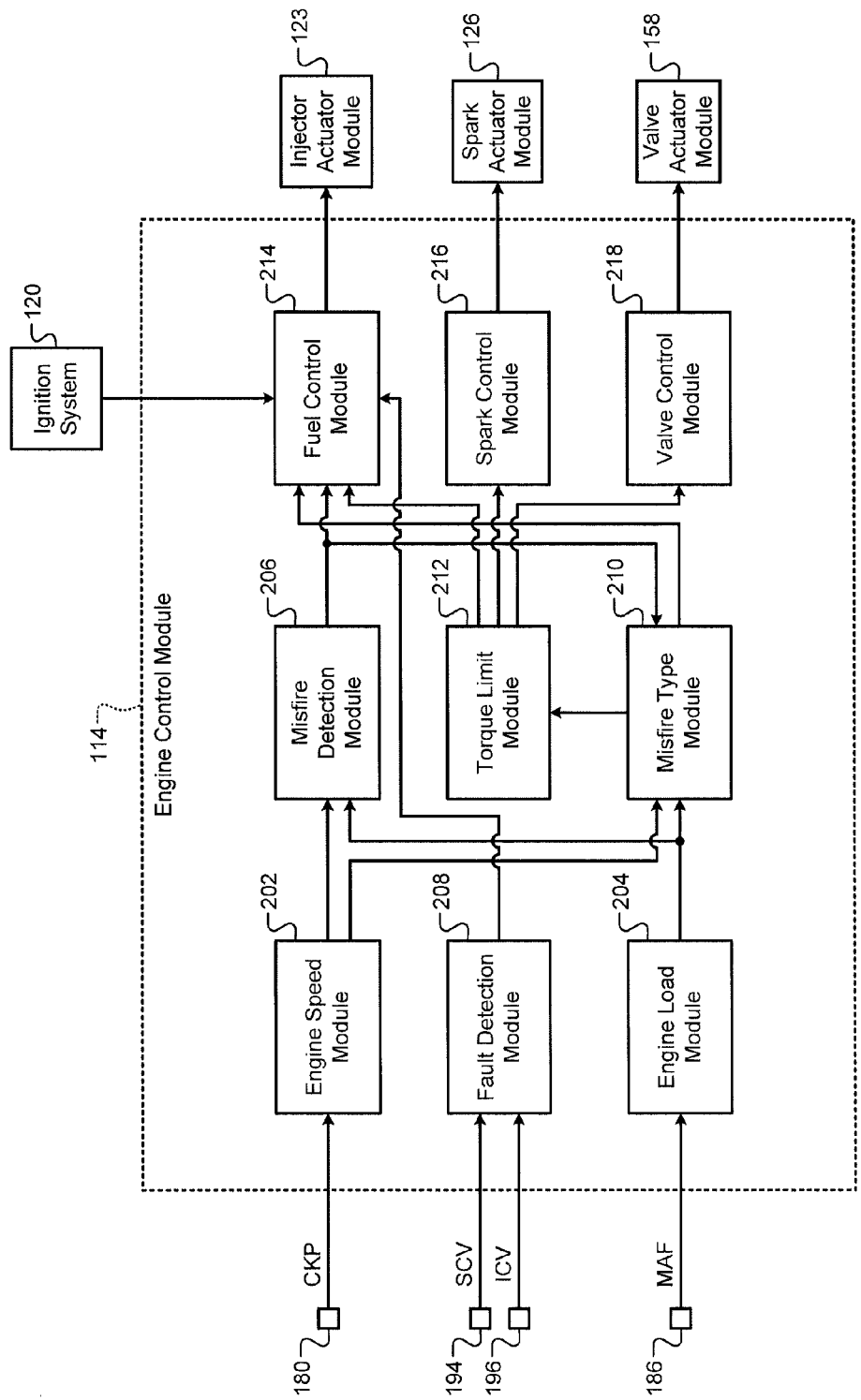
FIG. 2 is a functional block diagram of an example control system according to the principles of the present disclosure.

Referring to FIG. 2, an example implementation of the ECM 114 includes an engine speed module 202, an engine load module 204, a misfire detection module 206, a fault detection module 208, and a fuel control module 214. The engine speed module 202 determines engine speed. The engine speed module 202 may determine the engine speed based on the crankshaft position from the CKP sensor 180. For example, the engine speed module 202 may determine the engine speed based on a period of crankshaft rotation corresponding to a number of tooth detections. The engine speed module 202 outputs the engine speed.

The engine load module 204 determines engine load. The engine load module 204 may determine the engine load based on the mass flow rate of intake air from the MAF sensor 186 relative to a predetermined airflow capacity. Thus, the engine load may be expressed as a percent. The engine load module 204 outputs the engine load.

The misfire detection module 206 detects misfire in the engine 102. The misfire detection module 206 may detect misfire in a cylinder of the engine 102 based on changes in the engine speed associated with the cylinder. In one example, the misfire detection module 206 detects misfire in a cylinder based on engine acceleration and jerk associated with the cylinder. The misfire detection module 206 may detect misfire when the engine acceleration and jerk are less than predetermined values. The misfire detection module 206 may determine the engine acceleration and jerk by differentiating the engine speed with respect to time. The misfire detection module 206 may select the predetermined values based on the engine speed and the engine load. In addition, the misfire detection module 206 may compare the engine acceleration and jerk to multiple sets of predetermined values to detect different types of misfire.

In another example, misfire detection module 206 detects misfire based on values that are inversely proportional to the engine acceleration and jerk. To determine these values, the misfire detection module 206 may determine an event period associated with a cylinder event such as a firing event or a misfire. For example, for a four-cycle engine having eight cylinders, the event period may correspond to 90 degrees of crankshaft rotation. The misfire detection module 206 may determine a first difference between the event period for a present cylinder and the event period for a previous cylinder that precedes the present cylinder in a firing order. The misfire detection module 206 may determine a second difference between the first difference for the present cylinder and the first difference for the previous cylinder. The first and second differences are inversely proportional to engine acceleration and jerk.

The misfire detection module 206 may detect misfire in a cylinder of the engine 102 based on the first and second differences associated with the cylinder. The misfire detection module 206 may detect misfire when the first and second differences are greater than predetermined values. The misfire detection module 206 may select the predetermined values based on the engine speed and the engine load. In addition, the misfire detection module 206 may compare the first and second differences to multiple sets of predetermined values to detect different types of misfire. Detecting misfire based on the first and second differences may be more efficient and more accurate than detecting misfire based on the engine acceleration and jerk.

The misfire detection module 206 may set a diagnostic trouble code (DTC) associated with misfire when misfire is detected at a rate that is greater than a predetermined rate. For example, the misfire detection module 206 may set the misfire DTC when the number of misfires detected in a cylinder of the engine 102 over a predetermined number of engine cycles (e.g., 100 engine cycles) is greater than a predetermined number of misfires. The misfire detection module 206 may output a signal indicating whether the misfire DTC is set.

The fault detection module 208 detects faults in the spark plug circuit, the fuel system 160, and the fuel system 162. The fault detection module 208 may detect a fault in the spark plug circuit based on the voltage measured by the SCV sensor 194. Faults detected in the spark plug circuit may include a short to power, a short to ground, and/or an open circuit. The fault detection module 208 may detect these faults by determining whether the actual voltage of a spark plug driver corresponds to a commanded driver voltage. The engine 102 may include one ignition coil per cylinder, and the ECM 114 may include a separate driver for each ignition coil.

Faults detected in the fuel system 160 may include faults in the first injector circuit associated with the fuel injector 124. Faults detected in the fuel system 160 may include faults detected in the second injector circuit associated with the fuel injector 125. The fault detection module 208 may detect faults in the injector circuits based on the voltage measured by the ICV sensor 196. Faults detected in the injector circuits may include a short to power, a short to ground, and/or an open circuit. The fault detection module 208 may detect faults in the injector circuits based on current measured in the injector circuits. For example, the fault detection module 208 may detect a short when the measured current is greater than a predetermined current. The fault detection module 208 may then determine whether the short is a short to power or a short to ground based on the voltage measured by the ICV sensor 196. The fault detection module 208 outputs a signal indicating whether a fault is detected in the spark plug circuit, the first injector circuit, and/or the second injector circuit.

The misfire type module 210 determines the type of misfire detected. For example, the misfire type module 210 may determine whether misfire is periodic or random. Periodic misfire is misfire that occurs in the same cylinder(s) over multiple engine cycles. Periodic misfire may occur in the same cylinder(s) on every engine cycle or on engine cycles at regular spaced intervals such as every other engine cycle or every third engine cycle. Random misfire is misfire that does not occur on the same cylinder(s) from one engine cycle to another engine cycle. In a four-stroke engine, an engine cycle may correspond to 720 degrees of crankshaft rotation.

The misfire type module 210 may determine whether misfire is periodic or random based on misfire detection information received from the misfire detection module 206. The misfire detection information may include the number of misfires detected in each cylinder of the engine 102 over a predetermined number of engine cycles (e.g., 100 engine cycles). The misfire type module 210 may determine that a cylinder is periodically misfiring when the number of misfires detected in the cylinder over the predetermined number of engine cycles is greater than a predetermined number of misfires. The misfire type module 210 may output a signal indicating which ones of the cylinders of the engine 102, if any, are periodically misfiring.

The misfire type module 210 may determine whether misfire is catalyst damaging or emissions level. Catalyst damaging misfire may damage the catalyst in the catalytic converter 136. Emissions level misfire may increase emissions levels without damaging the catalyst.

The misfire type module 210 may determine that misfire is catalyst damaging when the number of misfires detected over the predetermined number of engine cycles is greater than a first value. The misfire type module 210 may determine a percentage of misfire relative to the total number of firing events during the predetermined number of engine cycles. The misfire type module 210 may determine that misfire is catalyst damaging when the percentage of misfire is greater than a first percent (e.g., 12 percent). The first value and/or the first percent may be predetermined. Additionally, the misfire type module 210 may determine the first percent based on a predetermined relationship between engine speed, engine load, misfire percentage, and catalyst damage. The misfire type module 210 may output a signal indicating whether misfire is catalyst damaging or emissions level.

In the example implementation of FIG. 2, the ECM 114 also includes a torque limit module 212, a fuel control module 214, a spark control module 216, and a valve control module 218. The torque limit module 212 may deactivate cylinder(s) of the engine 102 that are periodically misfiring. In this regard, the torque limit module 212 may be referred to as a cylinder deactivation module. The torque limit module 212 may output a signal indicating which cylinder(s) is/are deactivated.

The fuel control module 214 controls the fuel system 160 to deliver a first fuel to the cylinder 118. For example, the fuel control module 214 may output a first fueling rate, and the injector actuator module 123 may regulate the opening duration of the fuel injector 124 to achieve the first fueling rate. The fuel control module 214 controls the fuel system 162 to deliver a second fuel to the cylinder 118. For example, the fuel control module 214 may output a second fueling rate, and the injector actuator module 123 may regulate the opening duration of the fuel injector 125 to achieve the second fueling rate. The first fuel and the second fuel may be different types of fuel. For example, the first fuel may be a liquid fuel and the second fuel may be a gaseous fuel. In another example, the first fuel may be a liquid fuel such as gasoline and the second fuel may be a liquid fuel such as LPG.

The fuel control module 214 may instruct the injector actuator module 123 to stop delivering fuel to a cylinder when the cylinder is deactivated. The spark control module 216 controls the spark actuator module 126. The spark control module 216 may instruct the spark actuator module 126 to stop generating spark in a cylinder when the cylinder is deactivated. The valve control module 218 controls the valve actuator module 158. The valve control module 218 may instruct the valve actuator module 158 to stop opening intake and exhaust valves of a cylinder when the cylinder is deactivated.

The torque limit module 212 may limit the torque output of the engine 102 when random misfire is detected. In addition, the torque limit module 212 may decrease an upper limit on the torque output of the engine 102. Limiting the torque output of the engine may reduce exhaust gas temperatures, which may prevent the catalyst from overheating due to misfire and thereby prevent damage to the catalyst. The torque limit module 212 may output a signal indicating an engine torque limit. The fuel control module 214, the spark control module 216, and the valve control module 218 may adjust fuel delivery, spark delivery, and valve openings, respectively, based on the engine torque limit.

The fuel control module 214 may switch the type of fuel delivered to the cylinder 118 when misfire is detected in the cylinder 118. For example, the fuel control module 214 may switch from delivering the first fuel to the cylinder 118 to delivering the second fuel to the cylinder 118. Alternatively, the fuel control module 214 may switch from delivering the second fuel to the cylinder 118 to delivering the first fuel to the cylinder 118.

The fuel control module 214 may not switch the type of fuel delivered to the cylinder 118 when misfire is detected if the misfire is catalyst damaging and a fault is detected in the fuel systems 160, 162 or the spark plug circuit. Additionally, the fuel control module 214 may not switch the type of fuel delivered to the cylinder 118 if misfire is detected when either the first fuel or the second fuel is delivered to the cylinder 118. For example, after the fuel control module 214 switches the type of fuel delivered to the cylinder 118, the fuel control module 214 may not switch the type of fuel delivered to the cylinder 118 again if misfire is detected when delivering either fuel type.

If the engine 102 includes multiple cylinders, the fuel control module 214 may switch the type of fuel delivered to all of the cylinders of the engine 102 when misfire is detected in any of the cylinders. Alternatively, the fuel control module 214 may only switch the type of fuel delivered to the cylinders that are misfiring. The fuel control module 214 may not switch the type of fuel delivered to any of the cylinders when misfire is detected if the misfire is catalyst damaging and/or a fault is detected in the fuel systems 160, 162 or the spark plug circuit. Additionally, the fuel control module 214 may not switch the type of fuel delivered to any of the cylinders if misfire is detected when either the first fuel or the second fuel is delivered to the cylinders.

The fuel control module 214 may switch the type of fuel delivered to cylinders of the engine 102 when the misfire DTC is set. The fuel control module 214 may not switch the type of fuel delivered to cylinders of the engine 102 when the misfire DTC is set if the misfire is catalyst damaging and a fault is detected in the fuel systems 160, 162 or the spark plug circuit. Additionally, the fuel control module 214 may not switch the type of fuel delivered to any of the cylinders if the misfire DTC is set when either the first fuel or the second fuel is delivered to the cylinders.

In addition to setting the misfire DTC, the misfire detection module 206 may adjust a status of a misfire fault indicator to active when misfire is detected at a rate that is greater than a predetermined rate. The misfire detection module 206 may determine whether to set the misfire fault indicator to active or inactive one or more times for every drive cycle. To complete a drive cycle, two requirements may be met. First, the engine system 100 may be activated for at least a first predetermined period (e.g., 3 seconds). Second, after the ignition system 120 is switched off, the engine system 100 may be deactivated for a second predetermined period (e.g., 6 seconds). The engine system 100 may be activated when the engine 102 starts cranking. The fuel control module 214 may not switch the type of fuel delivered to any of the cylinders during a drive cycle until the misfire detection module 206 switches the status of the misfire fault indicator to active.

If the misfire detection module 206 sets the status of the misfire fault indicator to active during a drive cycle, the misfire detection module 206 may set the status of the misfire fault indicator to inactive when the engine 102 is shutoff for the second predetermined period (e.g., when the drive cycle ends). Then, when the engine 102 is restarted (e.g., when the next drive cycle begins), the fuel control module 214 may deliver the fuel that was delivered before the fuel type was switched. The fuel control module 214 may again switch the type of fuel delivered if the misfire fault indicator is again set to active.

The fuel control module 214 may deliver a liquid fuel to the cylinder 118 when catalyst-damaging misfire is detected in the cylinder 118. If the fuel control module 214 is delivering a gaseous fuel to the cylinder 118 when catalyst-damaging misfire is detected, the fuel control module 214 may switch from delivering the gaseous fuel to the cylinder 118 to delivering a liquid fuel to the cylinder 118. If the fuel control module 214 is already delivering a liquid fuel to the cylinder 118, the fuel control module 214 may continue to deliver the liquid fuel to the cylinder 118.

If the engine 102 includes multiple cylinders, the fuel control module 214 may deliver a liquid fuel to all of the cylinders in the engine 102 when catalyst-damaging misfire is detected in any of the cylinders. Alternatively, the fuel control module 214 may deliver a liquid fuel to only those of the cylinders in which catalyst-damaging misfire is detected. The fuel control module 214 may deliver a gaseous fuel to those of the cylinders in which catalyst-damaging misfire is not detected.

Figure 3:
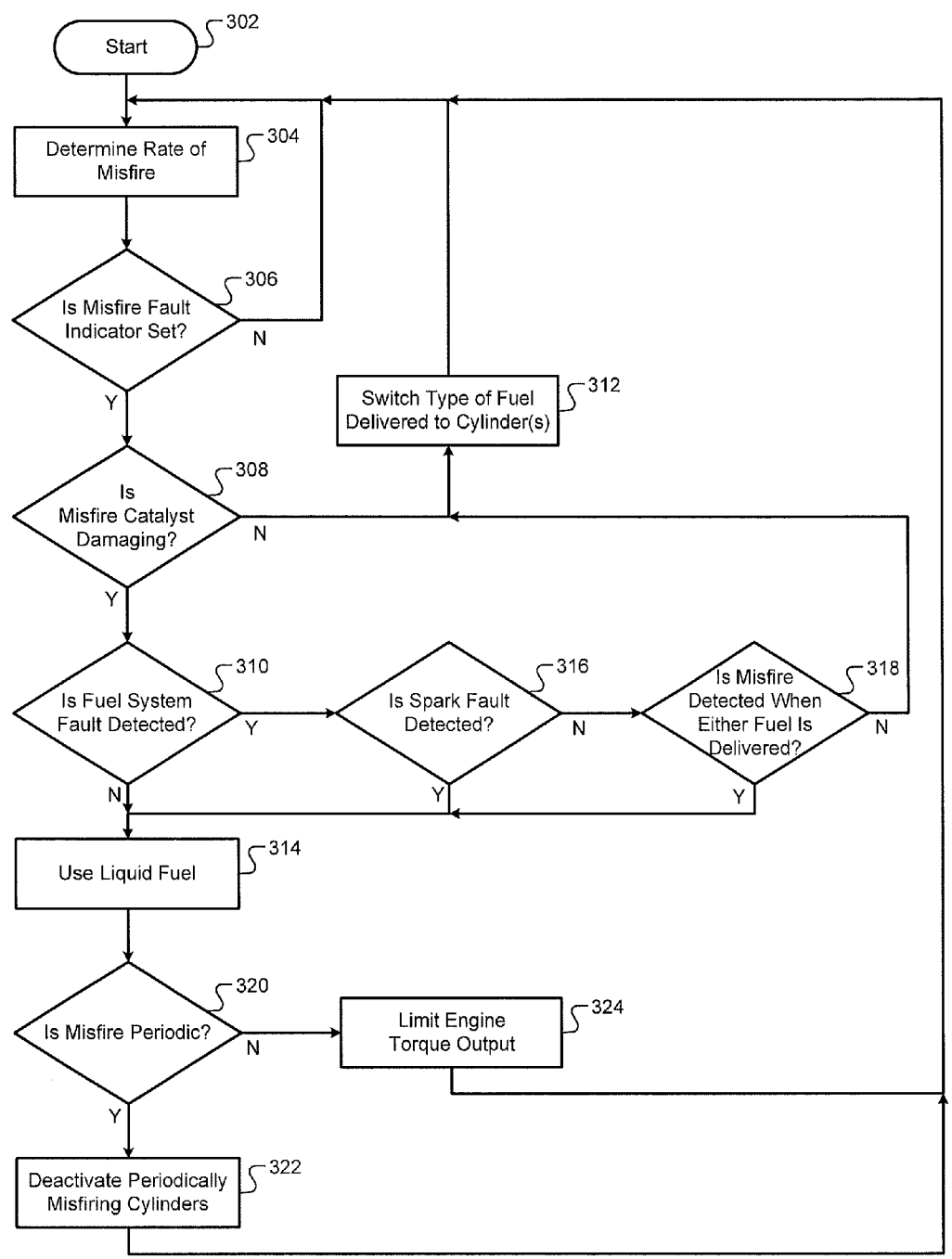
FIG. 3 is a flowchart illustrating an example control method according to the principles of the present disclosure.

Referring to FIG. 3, an example method for controlling an engine to prevent damage to a catalyst due to engine misfire in a bi-fuel vehicle begins at 302. At 304, the method determines a rate of misfire in the engine. For example, the method may determine how many misfires are detected in the engine over a predetermined number of engine cycles (e.g., 100 engine cycles). The method may also determine which cylinder(s) are associated with each of the misfires. The method may detect misfire based on changes in engine speed and/or periods associated with crankshaft rotation, as described above with reference to FIG. 2. The method may determine a percentage of misfire relative to the total number of firing events during the predetermined number of engine cycles.

At 306, the method determines whether a misfire fault indicator is set. The method may set the misfire fault indicator when the rate of misfire is greater than a predetermined rate. The method may determine whether the misfire fault indicator is set one or more times during a present drive cycle. If the misfire fault indicator is set, the method continues at 308. Otherwise, the method continues at 304.

At 308, the method determines whether misfire is catalyst damaging. The method may determine that misfire is catalyst damaging when the number of misfires detected over the predetermined number of engine cycles is greater than a first value. As mentioned above, the method may determine a percentage of misfire relative to the total number of firing events during the predetermined number of engine cycles. The method may determine that misfire is catalyst damaging when the percentage of misfire is greater than a first percent (e.g., 12 percent). The first value and/or the first percent may be predetermined. Additionally, the method may determine the first percent based on a predetermined relationship between engine speed, engine load, misfire percentage, and catalyst damage. If misfire is catalyst damaging, the method continues at 310. Otherwise, the method continues at 312. In various implementations, the method may determine whether misfire is catalyst damaging before determining whether the misfire fault indicator is set. Alternatively, the method may concurrently determine whether the misfire fault indicator is set and whether misfire is catalyst damaging.

At 312, the method switches the type of fuel delivered to one or more cylinders (e.g., all) of the engine. For example, the method may switch from delivering a liquid fuel using a first fuel system to delivering a gaseous fuel using a second fuel system. Alternatively, the method may switch from delivering a gaseous fuel using the first fuel system to delivering a liquid fuel using the second fuel system. The second fuel system may deliver fuel to cylinders of the engine independent from the first fuel system.

At 310, the method determines whether a fault is detected in a fuel system of the bi-fuel vehicle. For example, the method may determine whether an open circuit is detected in a fuel injector circuit. The fuel injector circuit may include a fuel injector and electrical components that are used to supply power to the fuel injector (e.g., relays, wiring, and connectors). If a fault is detected in a fuel system, the method continues at 316. Otherwise, the method continues at 314.

At 314, the method uses liquid fuel to allow fuel enrichment and thereby cool the catalytic converter and increase the torque output of the engine. For example, if the method is delivering a gaseous fuel to cylinders of the engine, the method may switch from delivering the gaseous fuel to delivering a liquid fuel. If the method is already delivering a liquid fuel to cylinders of the engine, the method may continue to deliver the liquid fuel to the cylinders.

At 316, the method determines whether a fault is detected in a spark plug circuit of the engine. The spark plug circuit may include a spark plug and electrical components that are used to supply power to the spark plug (e.g., relays, wiring, and connectors). If a fault is detected in a spark plug circuit, the method continues at 314. Otherwise, the method continues at 318.

At 318, the method determines whether catalyst damaging misfire is detected when either fuel is delivered to cylinders of the engine. For example, the method may determine whether catalyst damaging misfire is detected both when gaseous fuel is delivered using the first fuel system and when liquid fuel is delivered using the second fuel system. If catalyst damaging misfire is detected when either fuel is delivered to cylinders of the engine, the method continues at 314. If catalyst damaging misfire is not detected when either fuel is delivered to cylinders of the engine, or if the method has not yet switched the type of fuel delivered to the cylinders, the method continues at 312.

At 320, the method determines whether misfire detected in the engine is periodic. The method may determine that a cylinder is periodically misfiring when the number of misfires detected in the cylinder over a predetermined number of engine cycles (e.g., 100 engine cycles) is greater than a predetermined number of misfires. If periodic misfire is detected, the method continues at 322. Otherwise, the method continues at 324.

At 322, the method deactivates cylinder(s) of the engine that are periodically misfiring. The method may stop delivering fuel and spark to a cylinder and/or stop opening intake and exhaust valves of the cylinder when the cylinder is deactivated. At 324, the method limits the torque output of the engine. In addition, the method may decrease an upper limit on the torque output of the engine.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   a misfire detection module that detects misfire in a cylinder of an engine; and
   a fuel control module that:
      controls a first fuel system to deliver a first fuel to the cylinder; controls a second fuel system to deliver a second fuel to the cylinder, wherein the first fuel and the second fuel are different types of fuel; and
      selectively switches from delivering the second fuel to the cylinder to delivering the first fuel to the cylinder in response to a number of misfires detected in the cylinder over a predetermined number of engine cycles being greater than a first predetermined number.

2. The system of claim 1 wherein the fuel control module selectively switches from delivering the second fuel to the cylinder to delivering the first fuel to the cylinder when a rate of misfire in the cylinder is greater than a predetermined rate.

3. The system of claim 1 wherein the first fuel is a first type of liquid fuel, and the second fuel is a second type of liquid fuel that is different than the first type of liquid fuel.

4. A system comprising;
   a misfire detection module that detects misfire in a cylinder of an engine; and
   a fuel control module that:
      controls a first fuel system to deliver a first fuel to the cylinder;
      controls a second fuel system to deliver a second fuel to the cylinder, wherein the first fuel and the second fuel are different types of fuel;
      selectively switches from delivering the second fuel to the cylinder to delivering the first fuel to the cylinder in response to misfire being, detected in the cylinder;

selectively switches from delivering the second fuel to the cylinder to delivering the first fuel to the cylinder in response to a rate of misfire in the cylinder being greater than a predetermined rate; and switches from delivering the second fuel to the cylinder to delivering the first fuel to the cylinder in response to a percentage of misfire over a predetermined number of engine cycles being less than a predetermined percentage.

5. The system of claim 4 wherein the second fuel system delivers the second fuel to the cylinder independent from the first fuel system.

6. The system of claim 4 wherein the fuel control module selects the predetermined percentage based on a predetermined relationship between engine speed, engine load, misfire percentage, and catalyst damage.

7. The system of claim 6 wherein the first fuel is a gaseous fuel and the second fuel is a liquid fuel.

8. The system of claim 7 wherein the fuel control module selectively continues to deliver the second fuel to the cylinder when the percentage of misfire over the predetermined number of engine cycles is greater than the predetermined percentage.

9. The system of claim 8 wherein:
the fuel control module continues to deliver the second fuel to the cylinder when a fault is detected in at least one of the first fuel system, the second fuel system, and a spark plug circuit; and
the spark plug circuit includes a spark plug that generates spark in the cylinder and electronic components that supply power to the spark plug.

10. The system of claim 9 further comprising a cylinder deactivation module that deactivates the cylinder when:
the second fuel is delivered to the cylinder; and
the cylinder is periodically misfiring.

11. The system of claim 10 further comprising a torque limit module that limits torque output of the engine when:
the second fuel is delivered to the cylinder; and
the engine is randomly misfiring.

12. A method comprising:
detecting misfire in a cylinder of an engine;
controlling a first fuel system to deliver a first fuel to the cylinder;
controlling a second fuel system to deliver a second fuel to the cylinder, wherein the first fuel and the second fuel are different types of fuel; and
selectively switching from delivering the second fuel to the cylinder to delivering the first fuel to the cylinder in response to a number of misfires detected in the cylinder over a predetermined number of engine cycles being greater than a first predetermined number.

13. The method of claim 12 further comprising selectively switching from delivering the second fuel to the cylinder to delivering the first fuel to the cylinder when a rate of misfire in the cylinder is greater than a predetermined rate.

14. The method of claim 12 wherein the first fuel is a first type of liquid fuel, and the second fuel is a second type of liquid fuel that is different than the first type of liquid fuel.

15. A method comprising:
detecting misfire in a cylinder of an engine;
controlling a first fuel system to deliver a first fuel to the cylinder;
controlling a second fuel system to deliver a second fuel to the cylinder, wherein the first fuel and the second fuel are different types of fuel;
selectively switching from delivering the second fuel to the cylinder to delivering the first fuel to the cylinder in response to misfire being detected in the cylinder;
selectively switching from delivering the second fuel to the cylinder to delivering the first fuel to the cylinder in response to a rate of misfire in the cylinder being greater than a predetermined rate; and
switching from delivering the second fuel to the cylinder to delivering the first fuel to the cylinder in response to a percentage of misfire over a predetermined number of engine cycles being less than a predetermined percentage.

16. The method of claim 15 wherein the second fuel system delivers the second fuel to the cylinder independent from the first fuel system.

17. The method of claim 15 further comprising selecting the predetermined percentage based on a predetermined relationship between engine speed, engine load, misfire percentage, and catalyst damage.

18. The method of claim 17 wherein the first fuel is a gaseous fuel and the second fuel is a liquid fuel.

19. The method of claim 18 further comprising selectively continues to deliver the second fuel to the cylinder when the percentage of misfire over the predetermined number of engine cycles is greater than the predetermined percentage.

20. The method of claim 19 further comprising continuing to deliver the second fuel to the cylinder when a fault is detected in at least one of the first fuel system, the second fuel system, and a spark plug circuit, wherein the spark plug circuit includes a spark plug that generates spark in the cylinder and electronic components that supply power to the spark plug.

21. The method of claim 20 further comprising deactivating the cylinder when:
the second fuel is delivered to the cylinder; and
the cylinder is periodically misfiring.

22. The method of claim 21 further comprising limiting torque output of the engine when:
the second fuel is delivered to the cylinder; and
the engine is randomly misfiring.

23. A method comprising:
detecting misfire in a cylinder of an engine;
controlling a first fuel system to deliver a first fuel to the cylinder;
controlling a second fuel system to deliver a second fuel to the cylinder, wherein the first fuel and the second fuel are different types of fuel; and
selectively switching from delivering the second fuel to the cylinder to delivering the first fuel to the cylinder in response to a number of misfires detected in the cylinder over a predetermined number of engine cycles being greater than a first predetermined number and less than a second predetermined number.

24. The method of claim 23 wherein the first fuel is a gaseous fuel and the second fuel is a liquid fuel.

25. The method of claim 24 further comprising continuing to deliver the second fuel to the cylinder when the number of misfires detected in the cylinder over the predetermined number of engine cycles is greater than the second predetermined number.

* * * * *